(12) United States Patent
Gangemi (10) Patent No.: US 10,238,953 B2
(45) Date of Patent: Mar. 26, 2019

(54) METHOD FOR MANUFACTURING PROFESSIONAL GRADE SKATEBOARD DECKS USING RECYCLED WOOD FIBER VENEER SUBSTRATE

(71) Applicant: Robert Gangemi, Roslindale, MA (US)

(72) Inventor: Robert Gangemi, Roslindale, MA (US)

( * ) Notice: Subject to any disclaimer, the term of this patent is extended or adjusted under 35 U.S.C. 154(b) by 680 days.

(21) Appl. No.: 14/484,406

(22) Filed: Sep. 12, 2014

(65) Prior Publication Data

US 2014/0374962 A1    Dec. 25, 2014

Related U.S. Application Data

(62) Division of application No. 12/583,557, filed on Aug. 24, 2009, now abandoned.

(51) Int. Cl.
| | |
|---|---|
| *B27N 3/08* | (2006.01) |
| *C08L 97/02* | (2006.01) |
| *A63C 17/01* | (2006.01) |
| *B32B 21/02* | (2006.01) |
| *B32B 27/04* | (2006.01) |

(Continued)

(52) U.S. Cl.
CPC ............ *A63C 17/017* (2013.01); *B27N 3/007* (2013.01); *B27N 3/08* (2013.01); *B32B 21/02* (2013.01); *B32B 27/04* (2013.01); *B32B 27/30* (2013.01); *B32B 27/32* (2013.01); *B32B 37/12* (2013.01); *B32B 37/24* (2013.01); *B32B 38/0012* (2013.01); *B32B 38/04* (2013.01); *C08L 97/02* (2013.01); *A63C 2203/42* (2013.01); *B32B 2038/0016* (2013.01); *B32B 2038/047* (2013.01); *B32B 2305/22* (2013.01); *B32B 2305/70* (2013.01); *B32B 2307/402* (2013.01); *B32B 2309/04* (2013.01); *B32B 2310/0868* (2013.01); *B32B 2317/16* (2013.01);

(Continued)

(58) Field of Classification Search
CPC ....... A63C 17/017; C08L 31/04; C08L 97/02; B27N 3/002; B32B 21/02; C09J 131/04; C08J 2397/02
See application file for complete search history.

(56) References Cited

U.S. PATENT DOCUMENTS 2,682,083 A * 6/1954 Patton .................... B27N 5/00
                                                        264/119
5,633,299 A * 5/1997 Van Druten .......... C08G 67/02
                                                        524/13

(Continued)

FOREIGN PATENT DOCUMENTS

GB            2184139 A *   6/1987    .............. B27N 7/00

*Primary Examiner* — William P Bell
(74) *Attorney, Agent, or Firm* — Lambert Shortell & Connaughton; Gary E. Lambert; David J. Connaughton, Jr.

(57) ABSTRACT

An environmentally friendly composite material for use in the manufacture of professional grade skateboard decks and other high quality equipment and sporting gear. In the one embodiment, a skateboard deck is manufactured from a composition of recycled hard rock maple wood fibers, a polyvinyl acetate adhesive, a cross-link catalyst and water. The malleable nature of the composite material prior to curing, allows the skateboard deck to attain virtually any desired shape. Differing composites and adhesives may be employed to achieve the a similar product when properly cured. Once cured, the composite material is light weight, strong, durable, and requires no lacquers or other sealers.

1 Claim, 12 Drawing Sheets

(51) Int. Cl.
  *B32B 27/30* (2006.01)
  *B32B 27/32* (2006.01)
  *B32B 37/12* (2006.01)
  *B27N 3/00* (2006.01)
  *B32B 37/24* (2006.01)
  *B32B 38/00* (2006.01)
  *B32B 38/04* (2006.01)

(52) U.S. Cl.
  CPC ....... *B32B 2323/04* (2013.01); *B32B 2331/04* (2013.01); *Y10T 428/31989* (2015.04)

(56) References Cited

U.S. PATENT DOCUMENTS

| | | | | |
|---|---|---|---|---|
| 5,741,391 | A * | 4/1998 | Ollila | B27N 3/06 156/182 |
| 6,800,352 | B1 * | 10/2004 | Hejna | B27N 3/04 428/131 |
| 2005/0228082 | A1 * | 10/2005 | Yoneyama | C08L 31/04 524/27 |
| 2006/0226620 | A1 * | 10/2006 | Cole | A63C 17/01 280/87.042 |
| 2007/0020476 | A1 * | 1/2007 | Kintzley | B27N 3/002 428/537.1 |
| 2007/0267609 | A1 * | 11/2007 | Ratzsch | B27N 3/005 252/607 |
| 2008/0011194 | A1 * | 1/2008 | Mecca | B27N 3/002 106/164.01 |
| 2009/0131561 | A1 * | 5/2009 | Pfaadt | C08L 97/02 524/13 |
| 2009/0264560 | A1 * | 10/2009 | Warnes | B27N 1/00 524/13 |

* cited by examiner

METHOD FOR MANUFACTURING PROFESSIONAL GRADE SKATEBOARD DECKS USING RECYCLED WOOD FIBER VENEER SUBSTRATE

BACKGROUND OF THE INVENTION

Field of the Invention

The present invention relates generally to a method for manufacturing skateboard decks, and particularly, to a method for manufacturing professional grade skateboard decks using recycled wood fiber veneer as substrate and further to the deck developed using this method.

Description of the Related Art

The skateboarding industry is a multibillion dollar industry comprised of manufacturers, riders, and numerous media outlets across the United States and around the world. The skateboard deck, the component upon which a user is carried, is obviously an essential component of a skateboard. Consequently, the manufacturing process for skateboard decks is a crucial step in the manufacturing of skateboards.

The manufacturing process for skateboard decks is well known, and generally comprises a series of steps through which a number of wood veneer layers, in one optimal embodiment seven veneer layers, are glued and pressed together in a mold to form a uniform skateboard deck. In many embodiments, professional grade skateboard decks are manufactured using the highest quality hard maple wood, a material known to those skilled in the art as "hard rock maple." In the current state of the art, roughly 20% to 25% of the high quality "hard rock maple" material is lost during manufacturing, as a result of the removal of excess material, and associated sanding required for smoothing the deck's edges.

The present invention relates to a novel, environmentally friendly process for manufacturing skateboard decks, wherein said decks are manufactured using recycled high quality "hard rock maple," thereby reducing the demand for raw materials, reducing production costs, and improving a number of desirable deck properties such as durability, flexibility, and improved water resistance.

Although methods for deck manufacturing are widely known, and a number of variations exist dealing primarily with substitutions of substrate for wood veneer (fiberglass and carbon fiber), no environmentally friendly method for manufacturing professional grade skateboard decks presently exist in the art. Additionally absent are methods or decks utilizing primary raw material comprising recycled high quality "hard rock maple," to reduce production costs, improve performance, and reduce the environmental impact of manufacturing.

In summary, scrutiny of the foregoing prior art reveals that at present, there exists no environmentally friendly process for the manufacture of professional grade skateboard decks, that utilizes recyclable high quality "hard rock maple" as substrate.

SUMMARY OF THE INVENTION

The instant invention, as described further herein, imparts a novel, environmentally friendly method for manufacturing professional grade skateboard decks utilizing recycled high quality "hard rock maple" for improved durability, reduced production costs, and reduced environmental impact. The instant invention as illustrated herein, is neither anticipated, nor rendered obvious or present in any of the prior art methods, neither alone nor in any combination thereof.

The primary object of the instant invention is to provide a novel raw material for the manufacture of skateboard decks, wherein said raw material consists of recycled high quality "hard rock maple" wood.

Another object of the instant invention is to provide a method for the synthesis of said novel raw material, wherein said novel raw material can be utilized in the manufacture of skateboard decks.

Another object of the instant invention is to provide a method for the synthesis of said novel raw material, wherein said synthesis method maximizes the efficiency of raw material utilization during manufacture.

Another object of the instant invention is to provide a method for the synthesis of said novel raw material, wherein said synthesis method requires no lacquer, and consequently emits no volatile organic compounds during manufacture.

Another object of the instant invention is to provide a method for the synthesis of said novel raw material, wherein the chemical composition can be altered to attain different desirable physical properties such as thickness, elasticity, etc.

There has thus been outlined, rather broadly, the more important features of the method for manufacturing professional grade skateboard decks utilizing recycled high quality "hard rock maple" in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. Also, it is to be understood that the phraseology and terminology employed herein are for the purpose of the description and should not be regarded as limiting.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE PREFERRED EMBODIMENTS

Figure 1:
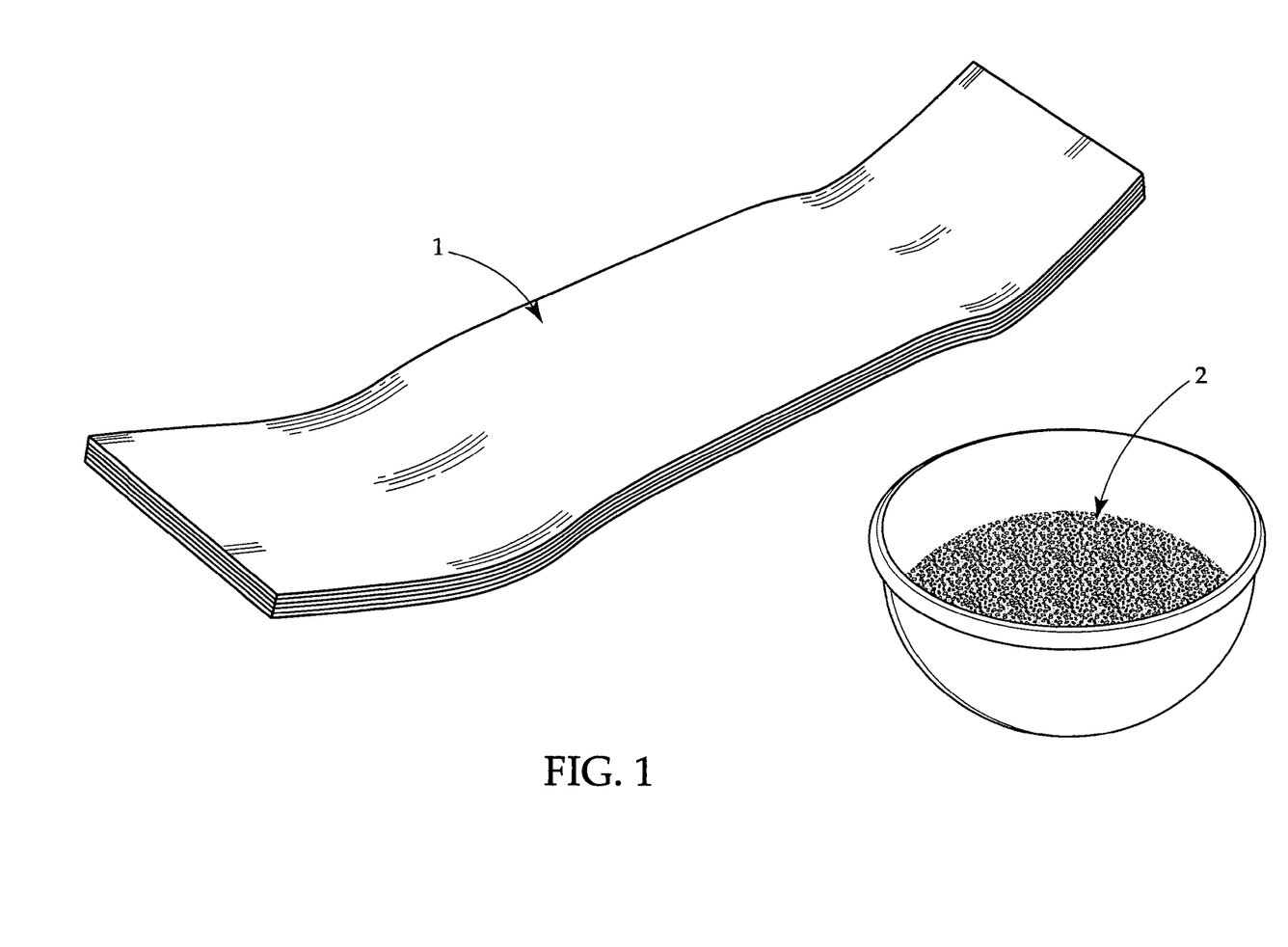
FIG. 1 illustrates the initial hard maple wood material in an initial phase, prior to the grinding into fiber phase and subsequent to the grinding into fiber phase.

Referring to the Figures, FIG. 1, the starting hard maple wood material both before and after grinding into fibers is illustrated. The instant process comprises utilization of a grinding machine to grind the hard maple wood into wood fibers is illustrated.

Figure 2:
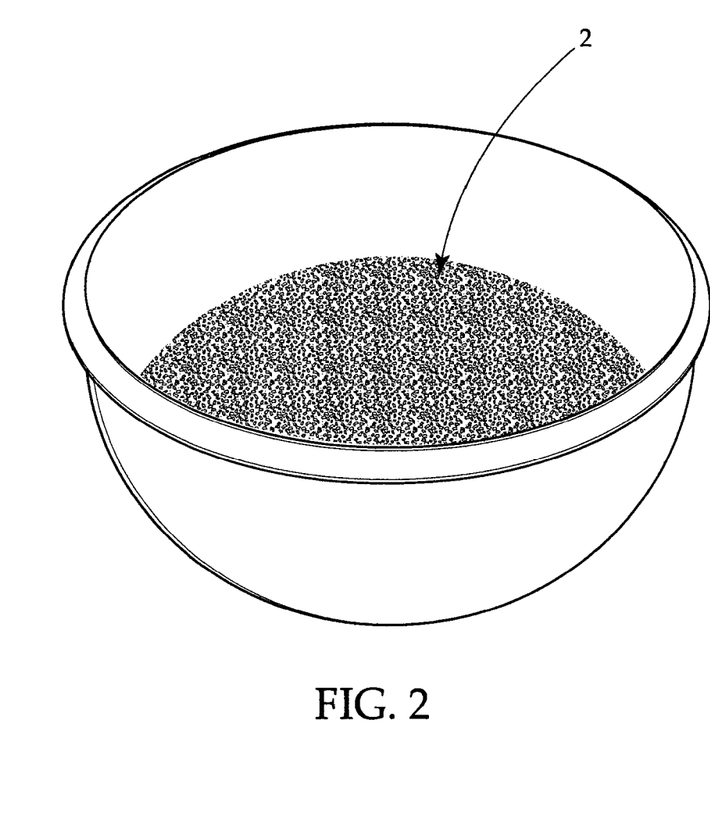
FIG. 2 illustrates the wood fibers.
Figure 3:
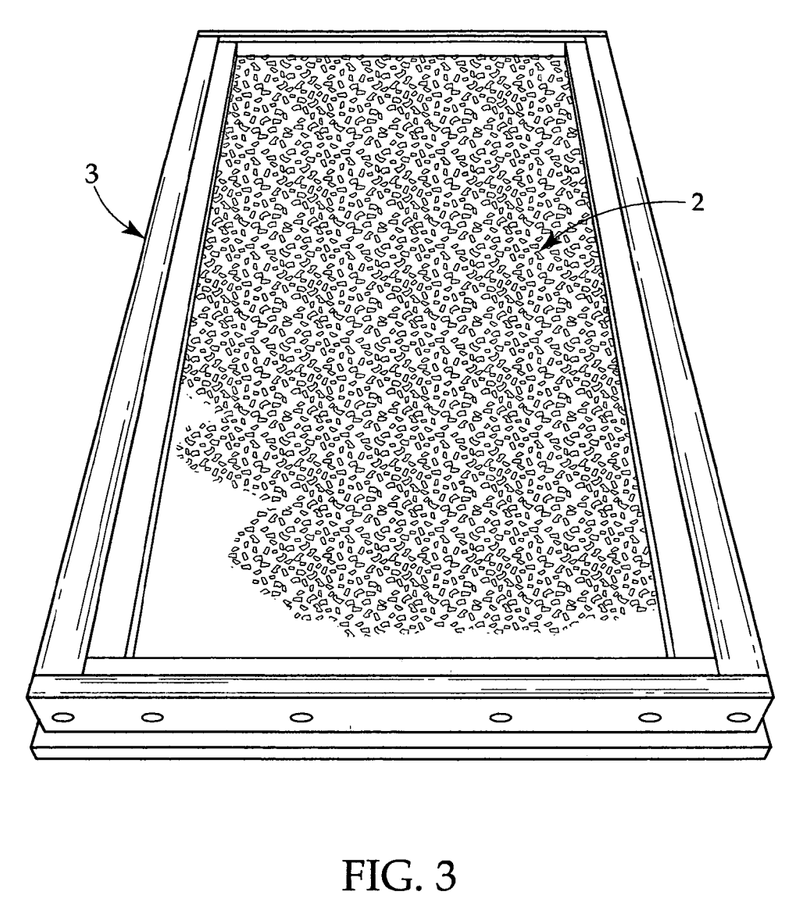
FIG. 3 illustrates a mold containing the maple wood fiber.
Figure 4:
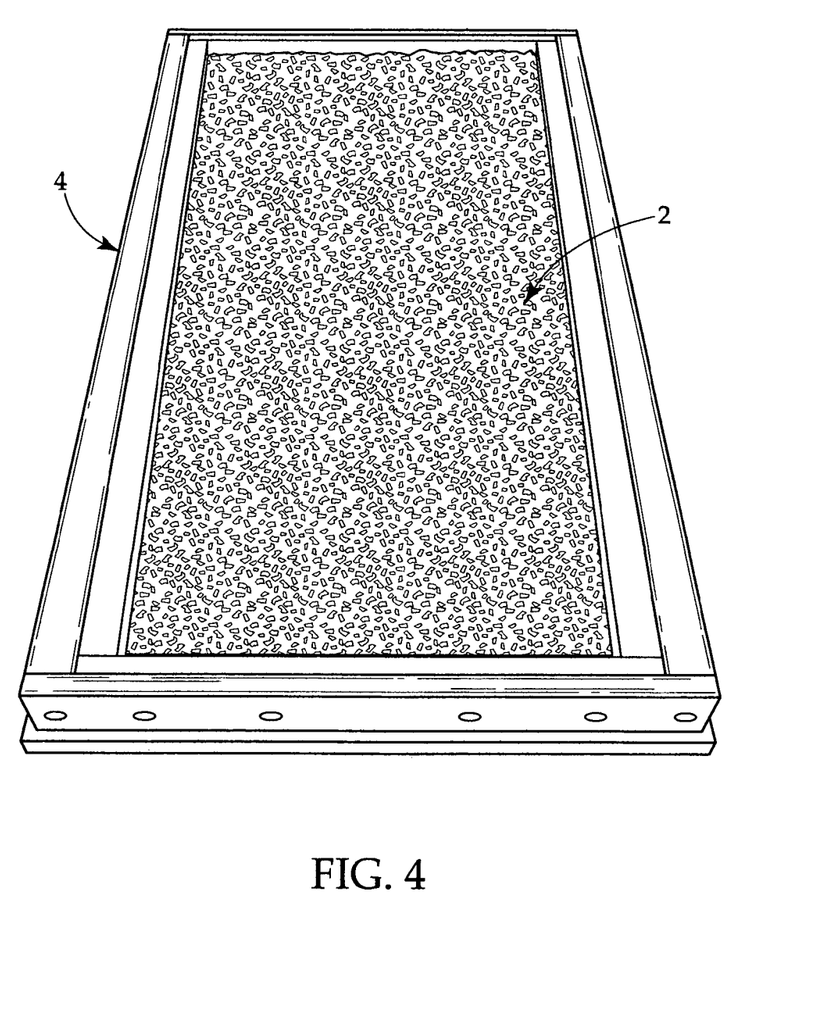
FIG. 4 illustrates an inferior half of a mold and further illustrates the maple wood fiber evenly spread throughout the mold.
Figure 5:
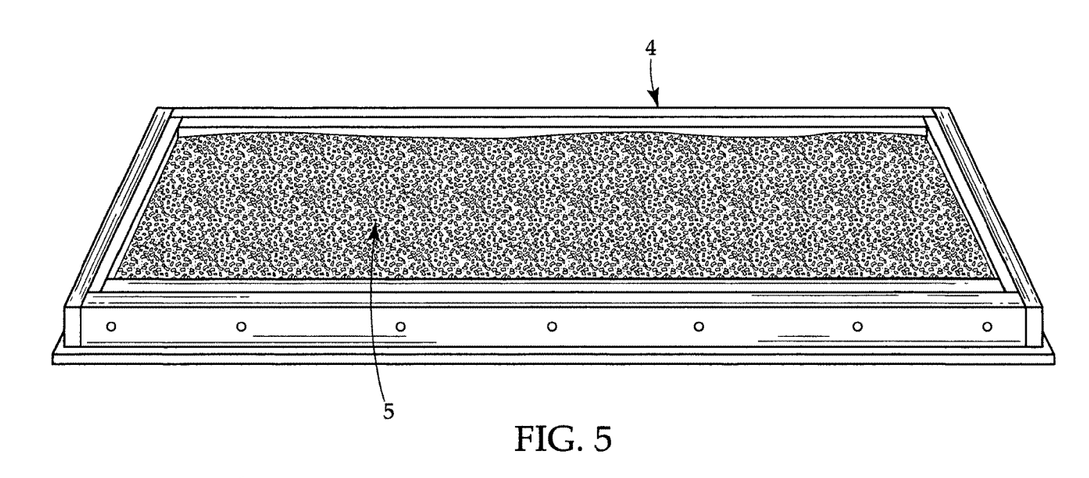
FIG. 5 illustrates an inferior half of a mold with a polyethylene sheet laying over the maple wood fiber for processing.
Figure 6:
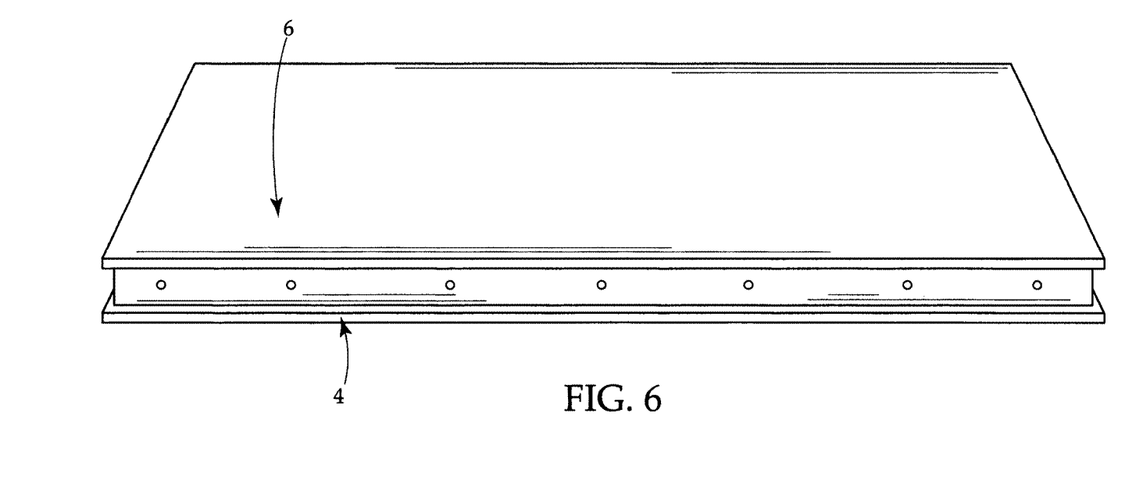
FIG. 6 illustrates a complete mold comprising a superior half and inferior half of the mold.
Figure 7:
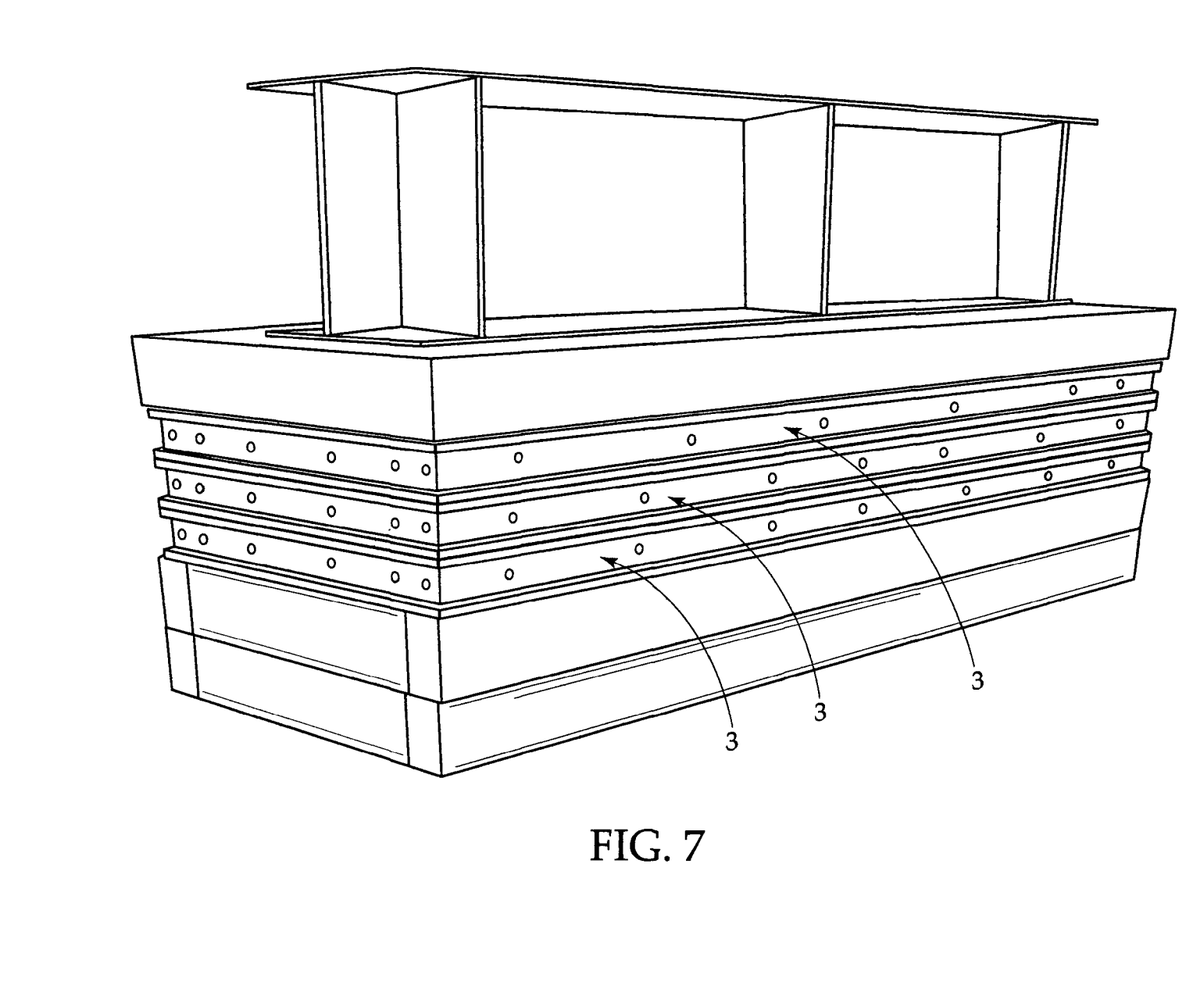
FIG. 7 illustrates a plurality of molds being concurrently pressed.

FIG. 1 illustrates the hard maple wood material in an initial phase 1, prior to the grinding into fiber phase and subsequent to the grinding into fiber phase 2. FIG. 2 illustrates a close up view of the wood fibers 2. FIG. 3 illustrates a mold 3 containing the maple wood fiber 2. FIG. 4 illustrates an inferior half of a mold 4 and further illustrates the maple wood fiber evenly spread throughout the mold 2. FIG. 5 illustrates an inferior half of a mold 4 with a polyethylene sheet 5 laying over the maple wood fiber for processing. FIG. 6 illustrates a complete mold comprising a superior 6 and inferior half of the mold 4. FIG. 7 illustrates a plurality of molds 3 being concurrently pressed.

Figure 8:
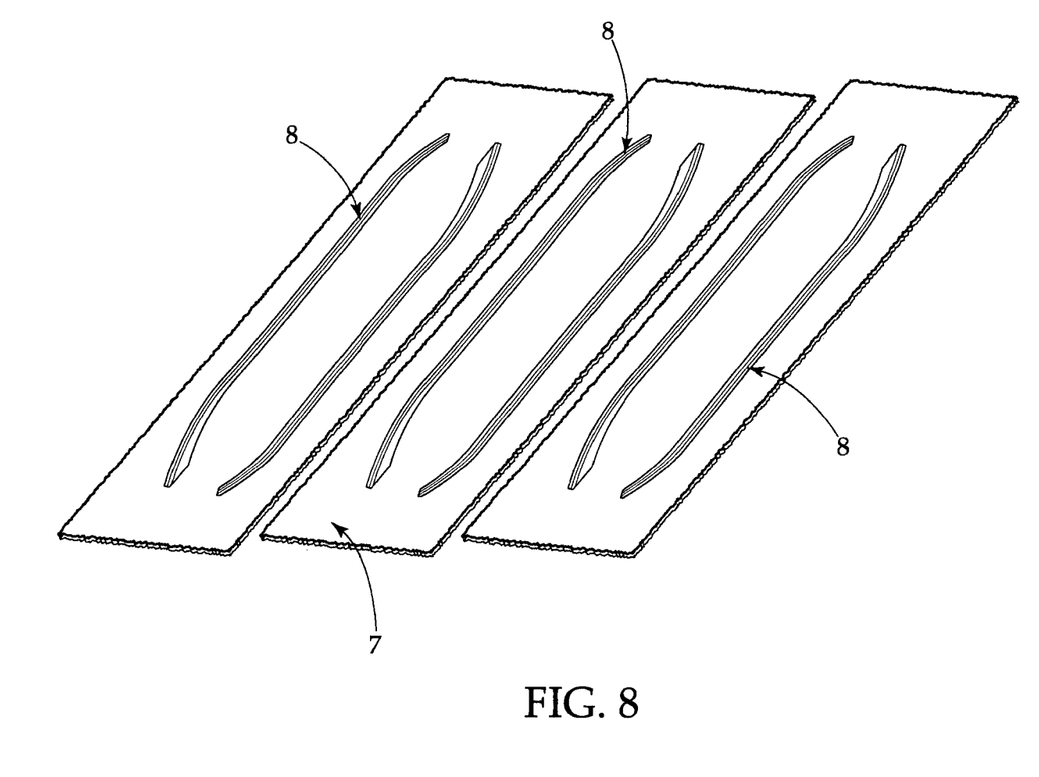
FIG. 8 illustrates a plurality of veneers comprising ribbed inserts.
Figure 9:
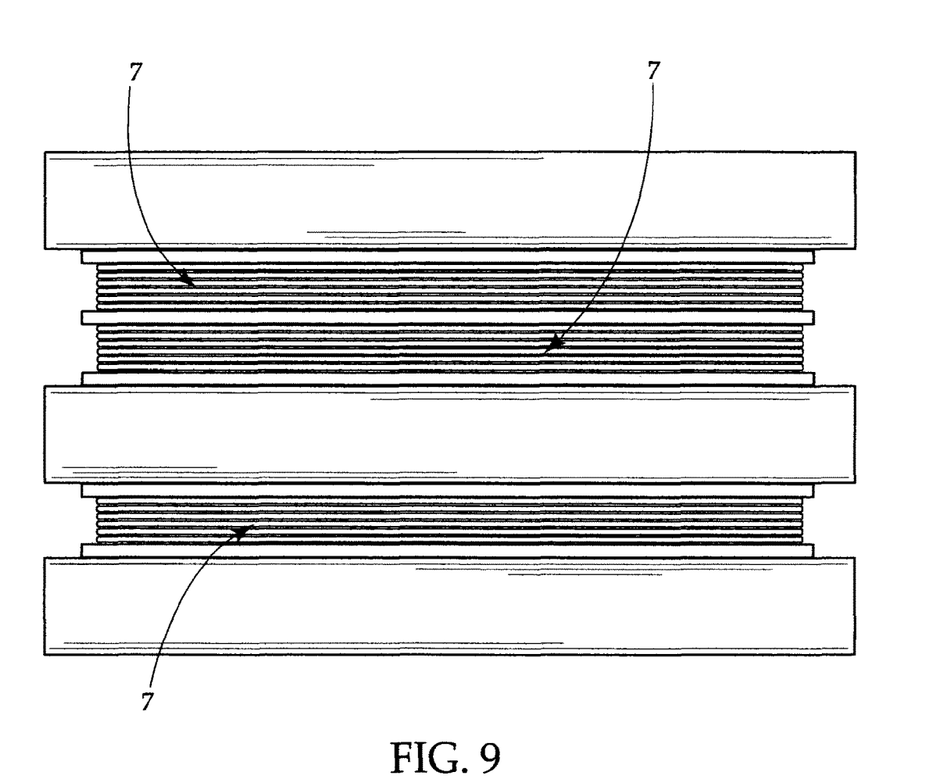
FIG. 9 illustrates a plurality of veneers concurrently being pressed.
Figure 10:
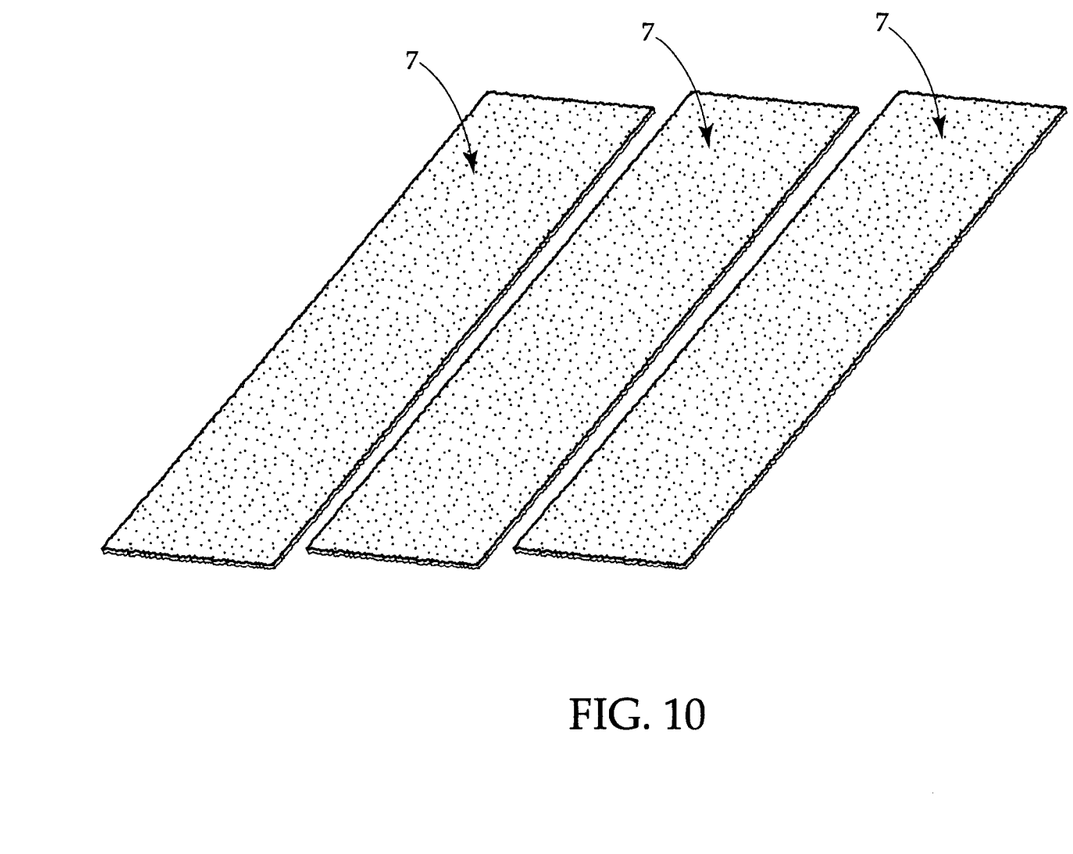
FIG. 10 illustrates a plurality of veneers comprising different hues.
Figure 11:
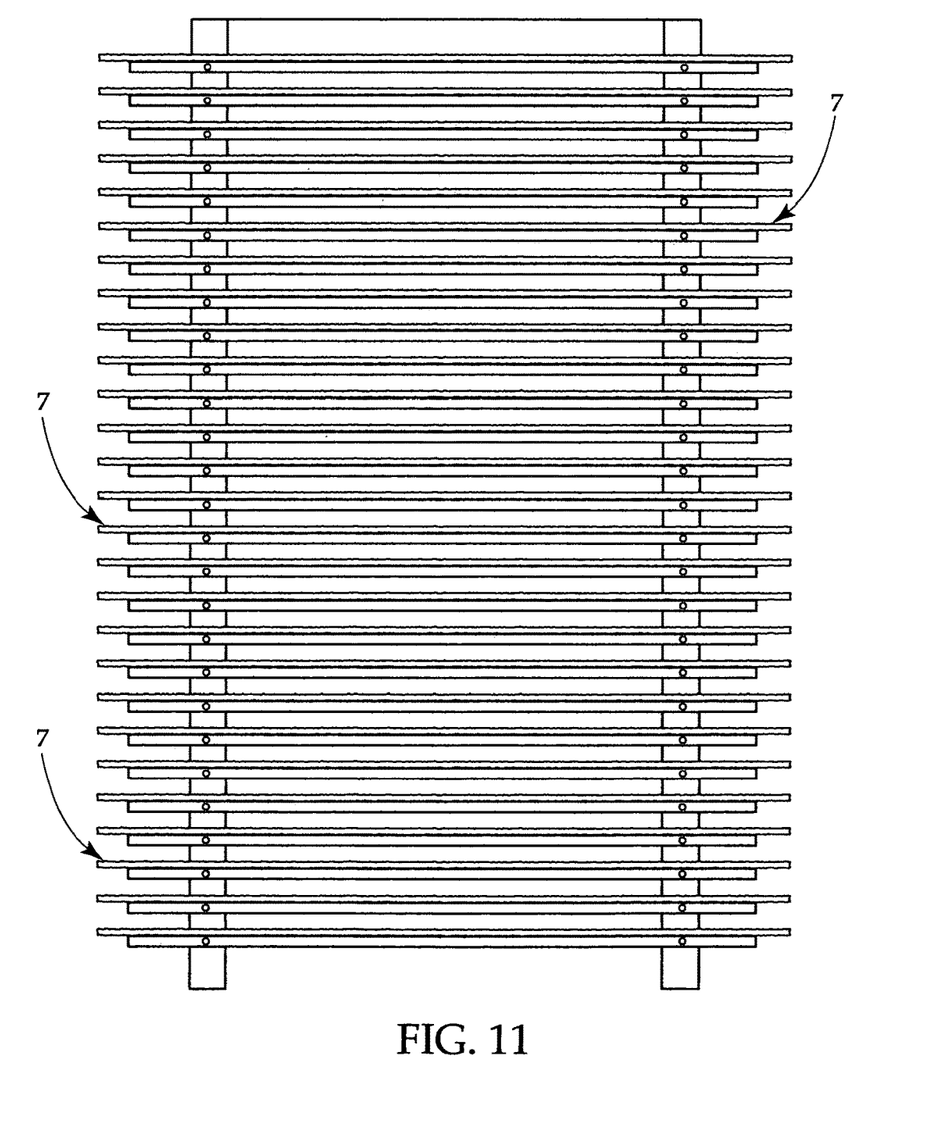
FIG. 11 illustrates a plurality of veneers during curing.
Figure 12:
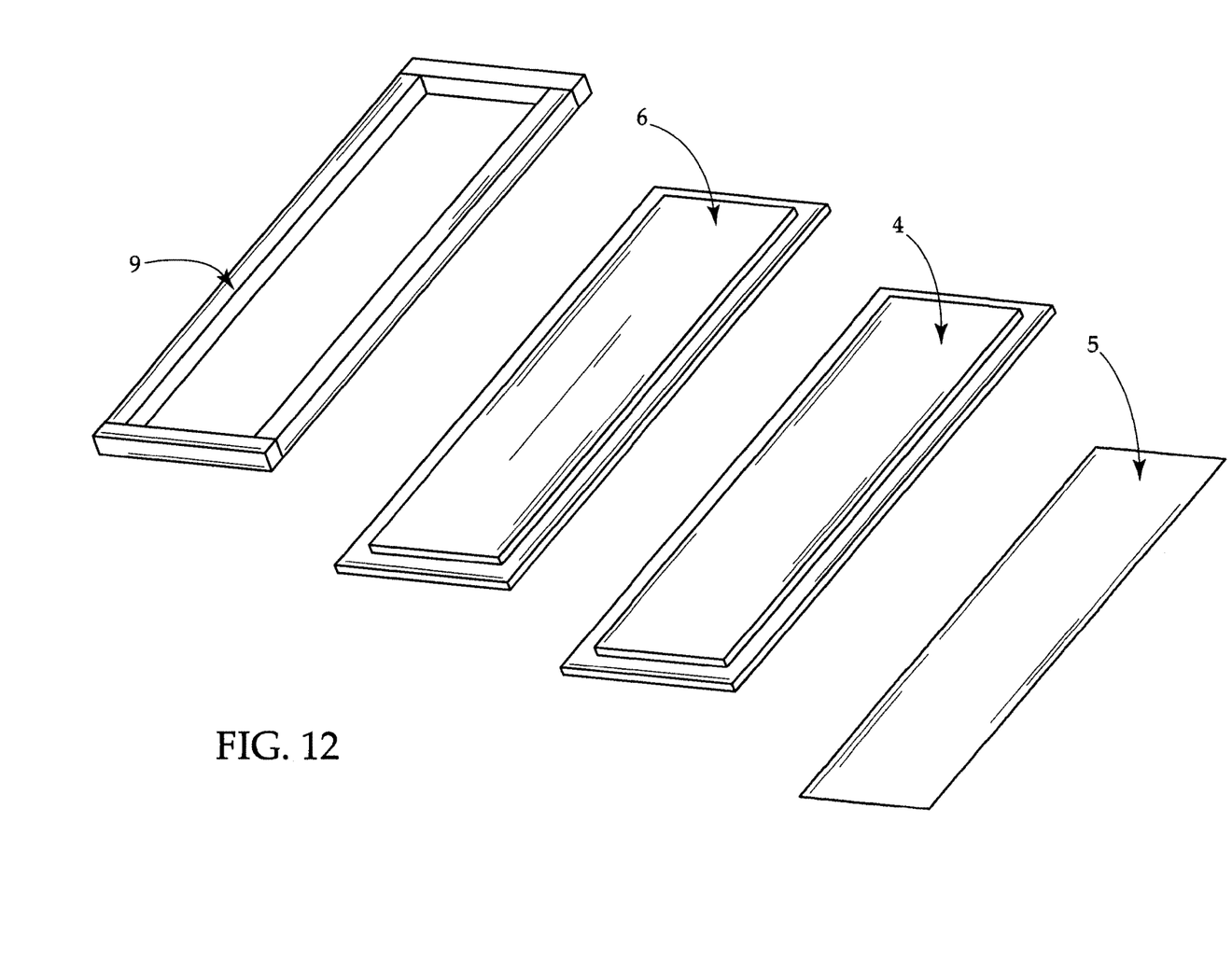
FIG. 12 illustrates the entirety of the mold components including superior half, inferior half, side railing, and polyethylene sheet; and, FIG. 13 illustrates a plurality of skateboard molds.
Figure 13:
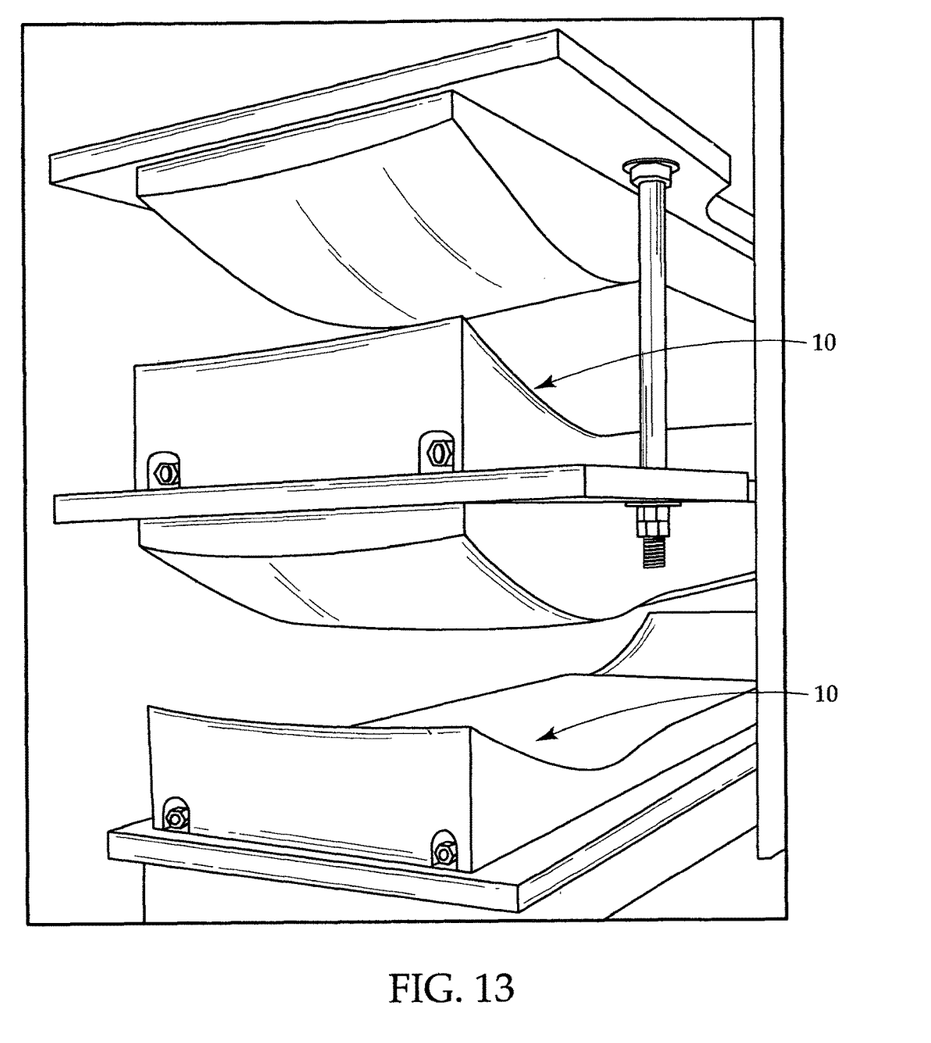

Additionally FIG. 8 illustrates a plurality of veneers 7 comprising ribbed inserts 8. FIG. 9 illustrates a plurality of veneers 7 concurrently being pressed and FIG. 10 illustrates a plurality of veneers 7 comprising different hues. FIG. 11 illustrates a plurality of veneers 7 during curing. FIG. 12 illustrates the entirety of the mold components including superior half 6, inferior half 4, side railing 9, and polyethylene sheet 5. Finally, FIG. 13 illustrates a plurality of skateboard molds 10.

In one embodiment, a material composition for the manufacture of skateboards and other sporting equipment such as snowboards or wakeboards may comprise a range of thirty percent to fifty percent by weight of polyvinyl acetate adhesive, a range of one percent to five percent by weight of liquid cross-link catalyst, a range of thirty percent to fifty percent by weight of recycled hard rock maple wood fibers, a range of fifteen percent to twenty percent by weight of water.

In the case of a skateboard deck, where the desired application is that of a 9.5 inch (24.1 centimeter)×35 inch (88.9 centimeter) veneer, the manufacture process consists of two stages. In the first stage of said process, 5.6 ounces (158.75 grams) of hard maple wood fibers are weighed. Said fibers are evenly spread onto a 9.5 inch (24.1 centimeter)×35 inch (88.9 centimeter) mold. Said mold is oscillated in order to attain optimal spread of the fibers, and a Polyvinyl Chloride tube is applied in order to level the fibers evenly throughout the mold.

Once the fibers are evenly distrusted along the mold, the edges of a pre-waxed polyethylene sheet measuring 9.5 inch (24.1 centimeter)×35 inch (88.9 centimeter) are rounded off, and said polyethylene sheet is ran through a FIN glue machine, which applies an adhesive layer of approximately 16 mil., onto the superior side (hereinafter glue side) of said polyethylene sheet. Immediately upon exiting the FIN glue machine, the Polyethylene sheet is placed glue side down in direct contact with the hard maple wood fibers. The superior half of the mold is placed directly over the inferior half of the mold, and the complete mold is placed under thirty tons of pressure for a period of twenty to thirty minutes.

After said pressing period, the mold is opened with the polyethylene sheet facing down, placed on a rack fiber side up, and allowed to cure for a period of forty eight hours. During the second stage of the process the veneer is placed on a clean surface glue side down. A fiber glass laminating tool is used to create abrasions in the substrate surface or abrase the substrate surface, in order to attain improved wood absorption. Thirty two ounces (0.946 Liters) of polyvinyl acetate adhesive are mixed with fourteen ounces (0.414 Liters) of warm water, allowing said mixture to settle from ten to twenty minutes in order to dissipate any air bubbles. After said settling period is complete, said mixture is sprayed onto the abrased surface of the veneer. This process is repeated from four to five times, allowing the veneer to absorb said mixture in between applications. The veneer is then allowed to cure from ten to fifteen minutes.

The veneer is then placed on a polyethylene sheet and introduced into a heat tunnel whose temperature can range from 110° Fahrenheit (43.3° Celsius) to 120° Fahrenheit (48.9° Celsius), allowing the surface glue to begin the drying process. Upon exiting the heat tunnel, two beads of glue are placed along the perimeter of the veneer, wherein said bead are placed approximately half an inch apart. The veneer is then placed glue side down onto an additional 9.5 inch (24.1 centimeter)×35 inch (88.9 centimeter) sheet of polyethylene plastic and a sharpened roller docker is applied onto the dried glued side of said veneer, wherein said roller perforates the veneer sequentially every quarter inch. An additional 9.5 inch (24.1 centimeter)×35 inch (88.9 centimeter) of polyethylene is placed on said veneer, such that polyethylene sheets are placed in direct contact with both superior and inferior surfaces of a single veneer. If a plurality of veneers are desired, a polyethylene sheet, a veneer, and a polyethylene sheet can be placed on top of another such that the number of veneers present will be one unit lower than the number of polyethylene sheets.

Once the desired number of veneers has been properly arranged, a rail is placed along the perimeter, veneers are placed on a press and are applied sufficient pressure to cause the beads of un-watered down glue to exit the veneer, while sealing the edges of said veneer, said process is completed within roughly one hour. Once sealing is attained the rails are removed, and the veneers are pressed for a period spanning approximately thirty six hours. Upon completion of said period, the veneers are removed from said press and allowed to cure for a period spanning approximately twenty four hours, upon completion of which the polyethylene is removed from the first glue side and then second glue side glue once second glue side has dried, the veneer is then allowed to cure from one to two weeks prior to making the recycled skateboard decks.

What is claimed is:

1. A method of manufacturing skateboard decks comprising the steps of:
    fabricating a mold, the mold having a plurality of sections arranged in a vertical arrangement with the plurality of sections vertically aligned, each section configured to define a plurality of skateboard concave shapes, such that a material placed within each of the plurality of mold sections will define a skateboard concave, the skateboard concave being an approximately planar shape with an upward curve along a lengthwise axis, and having an upwardly angled region at each of two lengthwise ends;

placing a composition consisting of hard rock maple wood fibers, polyvinyl acetate adhesive, a cross-link catalyst, and water into each of the sections of the mold, the mixture having a shape of a skateboard deck by being in the one of the plurality of mold sections, the hard rock maple wood fibers, polyvinyl acetate adhesive, a cross-link catalyst, and water consisting of:
   a range of thirty percent to fifty percent by weight of hard rock maple wood fibers;
   a range of thirty percent to fifty percent by weight of polyvinyl acetate adhesive;
   a range of one percent to five percent by weight of liquid cross-linking catalyst; and
   a range of fifteen percent to twenty percent by weight of water;
applying pressure to the mold;
curing said mixture in each of the sections of the mold using a radio frequency the curing forming a skateboard deck;
removing the cured skateboard deck from each of the plurality of sections of the mold; and
mounting two trucks on each of the plurality of skateboard decks.

\* \* \* \* \*